H. URNER.
NUT BOWL.
APPLICATION FILED MAY 7, 1915.

1,185,026.

Patented May 30, 1916.

Witnesses:
G. Garland Brown
W. Thornton Bogert

Inventor.
Henry Urner
By Walter H. Murray
Attorney

UNITED STATES PATENT OFFICE.

HENRY URNER, OF CINCINNATI, OHIO, ASSIGNOR TO THE QUEEN CITY SILVER COMPANY, OF CINCINNATI, OHIO, A CORPORATION OF OHIO.

NUT-BOWL.

1,185,026.  Specification of Letters Patent.  Patented May 30, 1916.

Application filed May 7, 1915. Serial No. 26,454.

*To all whom it may concern:*

Be it known that I, HENRY URNER, a citizen of the United States of America, and resident of Cincinnati, county of Hamilton, State of Ohio, have invented certain new and useful Improvements in Nut-Bowls, of which the following is a specification.

Figure 1:
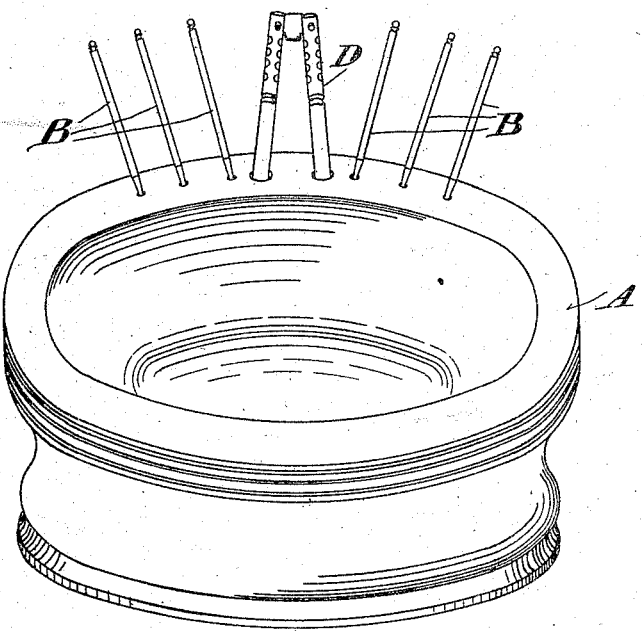
Figure 2:
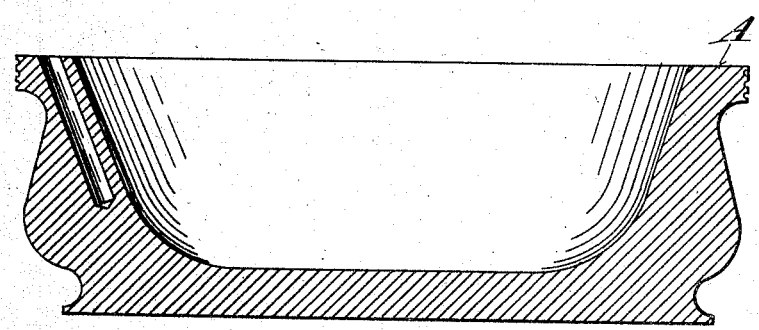

An object of my invention is to produce as a new article of manufacture a nut bowl in which the nut cracker and the nut picks will be conveniently accessible and in which the position of the nut cracker and the nut picks is such that they afford convenient handles for the bowl. This and other objects are attained in the article described in the following specification and illustrated in the accompanying drawings in which:

Figure 1 is a perspective view of a nut bowl comprising the article of manufacture embodying my invention. Fig. 2 is a sectional view of the receptacle taken on a line through one of the nut pick or nut cracker mounting bores.

In the article of manufacture embodying my invention, the nut receptacle A is preferably constructed of wood and is made in a circular form so that it may be conveniently turned from a block of wood. Wood is preferred because it will withstand the hard use to which articles of this kind are subjected. In addition to this the wooden construction presents a somewhat more ornamental appearance and is more in keeping with the appearance presented by the contents of the bowl.

The rim of the receptacle is made somewhat wide and is provided with a series of bores which extend from the top flat surface downwardly to a convenient depth, as shown in Fig. 2, for the purpose of receiving the nut picks B and nut cracker D as shown in Fig. 1. The bores for receiving the nut picks are preferably located in two series of three bores each, on each side of the bores provided for the nut cracker, and the bores of each series are inclined to the bores of the other series so that the picks and nut cracker will present a somewhat fan-like arrangement with relation to one another so that the cracker and picks may be easily reached.

In addition to the fan-like position of the bores, they are located in an inclined position from the center of the rim, at an angle to the bottom of the receptacle and parallel to the inclined sides of the interior surface thereof. This outward inclination of the cracker and picks affords handles by means of which the bowl may be moved about from place to place on the table and the fan-like arrangement due to the inclination of the bores, renders the grip of the implements on the receptacle more positive when adjacent diverging implements are grasped. The bores form firm supports for the cracker and the picks, so that after being used they are naturally stored together. Thus the receptacle for the nuts and the utensils for use in eating them are to be found together the next time nuts are to be eaten. The bottom of the bowl is flat. The external walls are substantially of the same circumference from the top to the bottom. Internally the walls converge toward the bottom.

Having thus described my invention, what I claim is:

As a new article of manufacture, a nut bowl comprising a flat bottomed receptacle having the sides of its interior surface inclined toward the center, with a series of inclined bores located in its wall parallel to the sides of the interior surface and inclined to each other, and implements mounted in the bores for the purpose described, whereby when the implements are grasped they will grip the walls of the bores and prevent their displacement therefrom.

In testimony whereof, I have hereunto subscribed my name this 5th day of May, 1915.

HENRY URNER.

Witnesses:
 W. THORNTON BOGERT,
 OTTO L. PECKSKAMP.